(12) United States Patent
Kress et al.

(10) Patent No.: US 8,353,646 B2
(45) Date of Patent: Jan. 15, 2013

(54) TOOL FOR MACHINING BOREHOLES

(75) Inventors: Dieter Kress, Aalen (DE); Friedrich Häberle, Lauchheim (DE)

(73) Assignee: Mapal Fabrik fur Prazisionswerkzeuge Dr. Kress KG, Aalen (DE)

( * ) Notice: Subject to any disclaimer, the term of this patent is extended or adjusted under 35 U.S.C. 154(b) by 1119 days.

(21) Appl. No.: 11/988,650

(22) PCT Filed: Jul. 13, 2006

(86) PCT No.: PCT/EP2006/006869
§ 371 (c)(1),
(2), (4) Date: Oct. 23, 2008

(87) PCT Pub. No.: WO2007/006575
PCT Pub. Date: Jan. 18, 2007

(65) Prior Publication Data
US 2009/0123241 A1    May 14, 2009

(30) Foreign Application Priority Data
Jul. 13, 2005   (DE) .................. 10 2005 034 430

(51) Int. Cl.
*B23D 77/02* (2006.01)

(52) U.S. Cl. ......... 408/231; 408/188; 408/199; 408/713

(58) Field of Classification Search .............. 408/187, 408/188, 199, 227, 231, 233, 713; B23B 29/03; B23D 77/02, 77/04
See application file for complete search history.

(56) References Cited

U.S. PATENT DOCUMENTS

| | | | | |
|---|---|---|---|---|
| 1,309,706 | A * | 7/1919 | Taylor | 408/230 |
| 4,116,580 | A * | 9/1978 | Hall et al. | 408/230 |
| 6,872,035 | B2 * | 3/2005 | Kress et al. | 408/1 R |
| 7,241,089 | B2 * | 7/2007 | Mast et al. | 408/233 |
| 2005/0025928 | A1 | 2/2005 | Annanolli et al. | |

FOREIGN PATENT DOCUMENTS

DE        21 08 619 A1    8/1972
(Continued)

OTHER PUBLICATIONS

Japanese Office Action for parallel application JP 2008-52081, mailed Dec. 13, 2011, with English translation thereof.
Korean Office Action of May 9, 2012 for parallel application KR 10-2008-7002742 with partial English translation including Summary and Reasons for Rejection.

*Primary Examiner* — Daniel Howell
*Assistant Examiner* — Michael Vitale
(74) *Attorney, Agent, or Firm* — Harness, Dickey, & Pierce, P.L.C.

(57) ABSTRACT

A tool for machining borehole surfaces, includes
   a base body,
   a cutting device having at least one cutting die with at least one geometrically defined tool edge, and at least one guide surface for guiding the tool (1) inside the machined borehole.
The at least one cutting die being tangentially fastened to the end face of the tool, and preferably embedded therein,
The at least one cutting die is provided with a rounded cut for producing a support surface adjacent to the tool edge is produced, the support surface being arched with a radius that is smaller than the radius of the borehole to be machined, and the region of the support surface directly adjoining the tool edge resting against the borehole wall to be machined, and the end region of the support surface, as viewed in the peripheral direction of the tool, which is situated at a distance from the tool edge being situated at a distance from the wall of the borehole.

20 Claims, 10 Drawing Sheets

FOREIGN PATENT DOCUMENTS

| | | |
|---|---|---|
| DE | 28 52 209 | 6/1980 |
| DE | 82 30 997 U1 | 4/1984 |
| DE | 33 16 380 A1 | 11/1984 |
| DE | 3820485 C1 * | 8/1989 |
| EP | 1122010 A1 | 8/2001 |
| GB | 183 252 A | 7/1922 |
| JP | 5-88806 U | 12/1993 |
| JP | 2000015512 A * | 1/2000 |
| JP | 2001-212703 A | 8/2001 |

* cited by examiner

TOOL FOR MACHINING BOREHOLES

CROSS-REFERENCE TO RELATED APPLICATIONS

This application is a National Stage of International application No. PCT/EP2006/006869, filed Jul. 13, 2006. This application claims the benefit of DE 10 2005 034 430.5, filed Jul. 13, 2005. The disclosures of the above applications are incorporated herein by reference.

The invention relates to a tool for machining boreholes.

Tools of this type are also referred to as cutting tools, and are used to remove shavings from borehole surfaces. In one known tool of this type (DE 82 30 997), multiple cutting dies are provided which have geometrically defined tool edges. When the tool is used, these tool edges remove shavings from a borehole wall. After the cutting dies are inserted into the tool the cutting dies are ground so that the geometrically defined tool edges, in particular at the secondary tool edges, are adjacent to a circular grinding bevel, i.e., a support region that is arched with a radius that corresponds to the radius of the borehole to be machined. The support surfaces directly adjoin the tool edges and follow behind same, viewed in the rotational direction of the tool. The function of the support regions designed as a circular grinding bevel is to stabilize and guide the tool inside the borehole, thereby avoiding vibrations which result in poor surface quality and reduced tool operating life. In addition, the surface of the machined borehole is smoothed by the support surfaces.

A disadvantage of tools with such a design is that tools having different circular grinding bevels must be provided for various borehole diameters. This is necessarily the case for tools having fixed tool edges. For tools with exchangeable cutting dies, this means that it is not possible to use the same exchangeable cutting die, i.e., a die having the same radius at the circular grinding bevel, for a given diameter range of various tools. For this reason the manufacture of the cutting dies is complicated and expensive.

The object of the invention therefore, is to provide a tool which does not have this disadvantage.

This object is achieved by providing a tool having a base body with a cutting device comprising at least one cutting die having at least one geometrically defined tool edge. This tool edge, unlike that for conventional tools, is inserted not into the peripheral surface, but instead, into the end face of the tool. The tool edge is fastened, preferably embedded in the end face, at that location. The tool has at least one guide surface for guiding the tool inside the machined borehole. The tool is characterized in that the at least one cutting die is provided with a rounded cut by means of which a support surface adjacent to the tool edge is produced. This support surface is arched with a radius that is smaller than the radius of the borehole to be machined. The support surface is configured such that the region directly adjoining the tool edge rests against the borehole wall to be machined. The end region of the support surface—viewed in the peripheral direction of the tool—which is situated at a distance from the tool edge is situated at a distance from the borehole. A wedge-shaped gap is thus formed between the support surface, provided with a rounded cut, and the borehole wall which opens toward the tool edge with increasing distance. The tool is thus guided inside the borehole to be machined via at least one guide surface, in addition to this support surface.

One preferred exemplary embodiment of the tool is characterized in that the at least one guide surface is formed by a guide strip or by another cutting die, which likewise is provided with a rounded cut of the type described above, and which thus has a support surface which guides the tool inside the borehole, i.e., is used as a guide surface.

One particularly preferred exemplary embodiment of the tool has a cutting die with a rounded cut of the type described above, in addition to two guide strips with guide surfaces, or also a cutting die having a rounded cut of the type described above, i.e., a support surface, which is used as a guide surface. When such a tool is used, the region of the support surface directly adjoining the tool edge rests against the borehole wall to be machined. An end region of the support surface, situated at a distance from the tool edge, which adjoins a sloping free surface is situated at a distance from the borehole wall. This results in a gap which widens from the tool edge, viewed in the direction opposite the rotational direction of the tool.

For tools of the type described here, it has been shown that for such a design, i.e., by use of a rounded cut, it is possible to machine not only boreholes of a given diameter, but also to use the same cutting die for boreholes of different diameters. Thus, for boreholes of various diameters it is no longer necessary to use cutting dies whose support region is exactly matched to the diameter of the borehole to be machined. Instead, it is possible to use the same exchangeable cutting die having a given radius in the region of the support surface for a defined diameter range of various tools.

In one preferred exemplary embodiment of the tool, the distance between the end region of the support surface and the wall of the machined borehole is approximately 0.02 mm to 0.001 mm, in particular 0.01 mm to 0.003 mm. The support surface is preferably designed in such a way that at the transition of the support surface to the free surface, the distance from the borehole wall is not greater than 0.005 mm.

Further designs of the tool result from the subclaims.

The invention is explained in greater detail below with reference to the drawings, which show the following:

The core concept of the design of the tool is that in the machining of borehole surfaces the tool is supported by means of the at least one cutting die of the cutting device and at least one guide surface on the borehole surface. The at least one cutting die has a rounded cut by means of which a support surface is produced adjacent to the at least one geometrically defined tool edge of the cutting die, so that the tool is guided inside the borehole via this support surface of the at least one cutting die and via the at least one guide surface.

Figure 1:
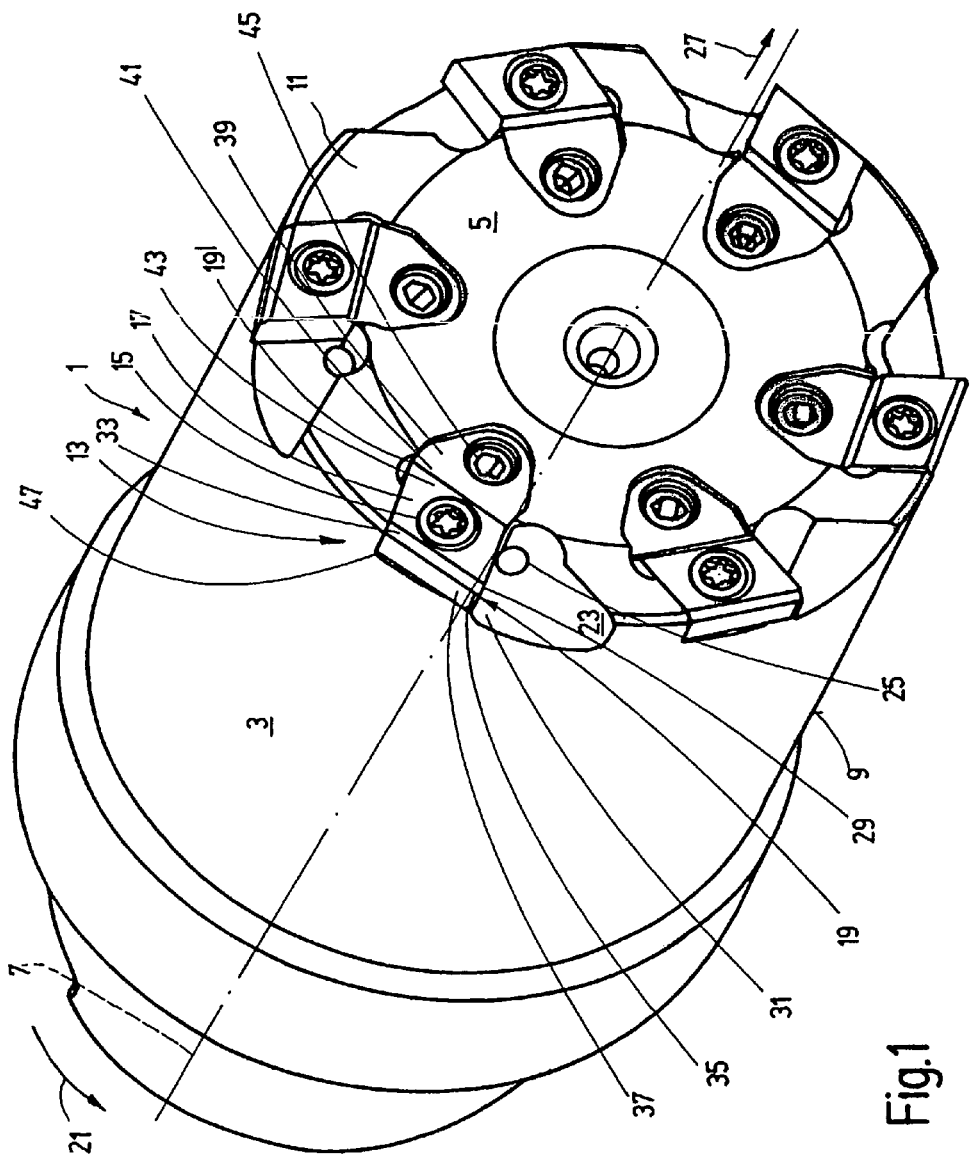
FIG. 1 shows a perspective front view of a first exemplary embodiment of a tool.

The first exemplary embodiment of a tool 1 for machining boreholes illustrated in FIG. 1 has a base body 3 with an end face 5, which lies in a plane perpendicular to the center axis 7 of the tool 1.

The end face 5 has an annular surface 11 which slopes outward in the direction of the peripheral surface 9 of the tool 1. The at least one cutting die 13 of the tool 1 is tangentially inserted into this annular surface. The term "tangential" means that the front surface of the cutting die 13 is essentially parallel to the annular surface 11 of the tool 1.

The exemplary embodiment of the tool 1 illustrated in FIG. 1 is a fine machining tool having at least three, in this case by way of example six, tool edges of identical design. Thus, the cutting die 13 in the upper left (11 o'clock) position is discussed in greater detail below. The entire description for this cutting die also applies to the other cutting dies of the tool 1. As an example, it is assumed here that six cutting dies, provided in pairs approximately opposite one another, are embedded in the base body 3, i.e., in the peripheral surface 11, at unequal intervals.

The cutting die 13 is fixed in place on the base body 3 by means of a suitable mounting. In this case a tensioning screw 15 is provided which passes through the front side 17 of the cutting die 13 and engages in the base body 3 of the tool 1.

The cutting die 13 has a polygonal design, in the present case essentially rhombic as viewed from above. The upper left corner of the cutting die 13 forms the tool edge 19 of the cutting die 13. This tool edge projects beyond the peripheral surface 9 of the base body 3 of the tool 1, and upon rotation of the tool 1 in the direction of the arrow 21 removes shavings from a wall of a borehole. These shavings pass into a chip space 23 into which a coolant/lubricant channel 25 may flow. The coolant/lubricant is used to cool the tool edge 19, to discharge the shavings passing into the chip space 23, and to lubricate the tool 1 in the borehole to be machined.

In the machining of a borehole the tool 1, as previously discussed, is able to rotate about the center axis 7. However, it is also possible to set the workpiece in rotation and secure same to the tool 1. The relative motion between the tool 1 and the change walls of the borehole to be machined is crucial. During the machining the tool 1 is displaced in the direction of the center axis 7, into the borehole to be machined. This direction, also referred to as the feed direction, is indicated by an arrow 27.

The tool edge 19 of the cutting die 13 has two regions, namely, a primary tool edge 29 inclined in the feed direction, identified by the arrow 27, and a secondary tool edge 31 inclined in the opposite direction.

In this case the cutting die 13, the same as the other cutting dies, is designed as a turning die; i.e., the diagonally opposite corner of the cutting die 13 is likewise provided as a tool edge 19'. When the tool edge 19 is worn or damaged, the cutting die 13 is rotated by 180° about an axis perpendicular to the front side 17, so that the tool edge 19' is situated in the position of the tool edge 19 shown in FIG. 1.

The illustration according to FIG. 1 shows that adjacent to the front side 17 of the cutting die 13 is an outwardly sloping bevel 33 whose width corresponds to the width of the length of the primary tool edge 29.

Adjacent to the secondary tool edge 31 is a support surface 35, produced by a rounded cut, which in this case is indicated only by a line parallel to the secondary tool edge 31. The support surface 35 has an arched design, the radius of the arch being smaller than the radius of the borehole to be machined. The arch extends transverse to the center axis 7.

The support surface 35 directly adjoins the secondary tool edge 31. The end region of the support surface 35 facing away from the secondary tool edge 31 merges into the free surface 37 of the cutting die 13. Starting from the bevel 33, the free surface 37 slopes in the direction opposite the feed direction indicated by arrow 27. Thus, the bevel 33 associated with the primary tool edge 29 slopes in the feed direction.

The projection of the tool edge 19 of the cutting die 13 beyond the peripheral surface 9 of the base body 3 of the tool 1 is adjustable. In the tool 1 illustrated here, the radial adjustability of the cutting die 13 is achieved by providing an adjusting element 39 which together with an adjusting face acts on the radially inwardly situated side face 43 of the cutting die 13. The adjusting face 41 and the side face 43 are inclined so as to form a wedge gear, in a manner of speaking. The position of the adjusting element 39 may be adjusted by means of a set screw 45 which engages in the adjusting element 39 and also in the base body 3 of the tool 1. This set screw is engaged by a greater or shorter distance in the end face 5. The wedged gear may be designed, for example, so that when the adjusting element 39 is engaged in the base body 3 by a longer distance the cutting die 13 is displaced radially outward. Adjusting devices of the type described here are known (see, for example, German patent application 10060283); therefore, no further discussion is necessary. In other respects, the function of the radial adjustability of the cutting die 13 does not depend on implementation of the adjusting device. However, the adjusting element 39 described here is characterized in that it has a V-shaped outer contour which engages in a corresponding V-shaped recess in the base body 3 and thus allows precise angular positioning. This ensures that when the cutting die 13 is radially displaced it is not twisted by the tensioning screw 15.

In this manner the angular position of the free surface 37 relative to the base body 3 of the tool 1 is maintained. Namely, the free surface 37 slopes from left to right, starting from the support surface 35 (in the perspective according to FIG. 1), to prevent the corner 47 of the cutting die situated opposite from the tool edge 19 from contacting and thus damaging the wall of the borehole to be machined.

Figure 2:
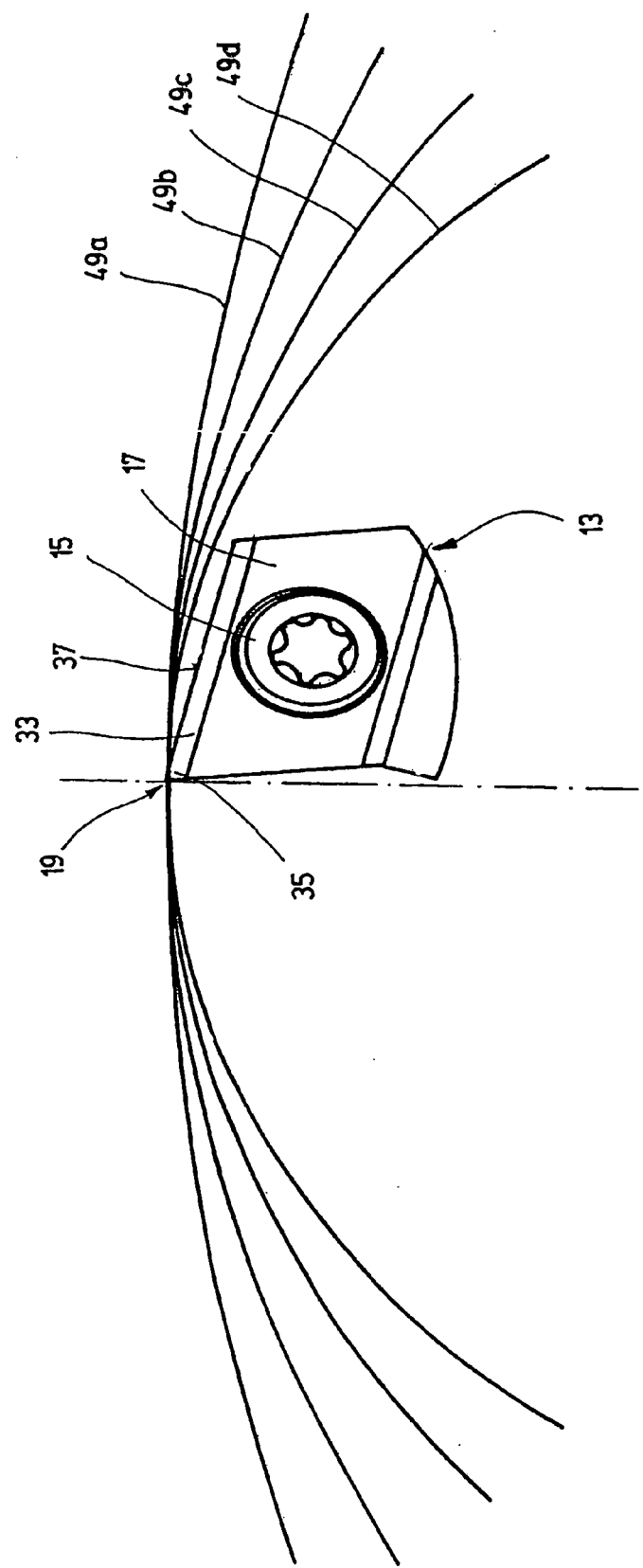
FIG. 2 shows a cutting die of the tool according to FIG. 1 in a perspective front view.

FIG. 2 shows by way of example the cutting die 13 of the tool 1 from a viewing direction along the center axis 7 illustrated in FIG. 1. Thus, in practical terms FIG. 2 shows a top view of the end face 5 and the annular surface 11 in which the cutting die 13, illustrated here in a broken manner, is inserted. The adjusting element 39 has been omitted for clarity. Parts which are identical to those of FIG. 1 have been provided with the same reference numerals, so that reference is made to the description thereof.

The tool edge 19 is visible in FIG. 2. The support surface 35 is barely discernible. On the other hand, the free surface 37 as well as the bevel 33 associated with the primary tool edge are easily seen. FIG. 2 also shows the front side 17 of the cutting die 13. Lastly, the tensioning screw 15 is also readily visible.

FIG. 2 shows that the cutting die 13 may be used to machine boreholes of different diameters. This is illustrated in FIG. 2 by four lines representing circular segments, namely, circular segments 49a, 49b, 49c, and 49d of the borehole wall to be machined.

Figure 3:
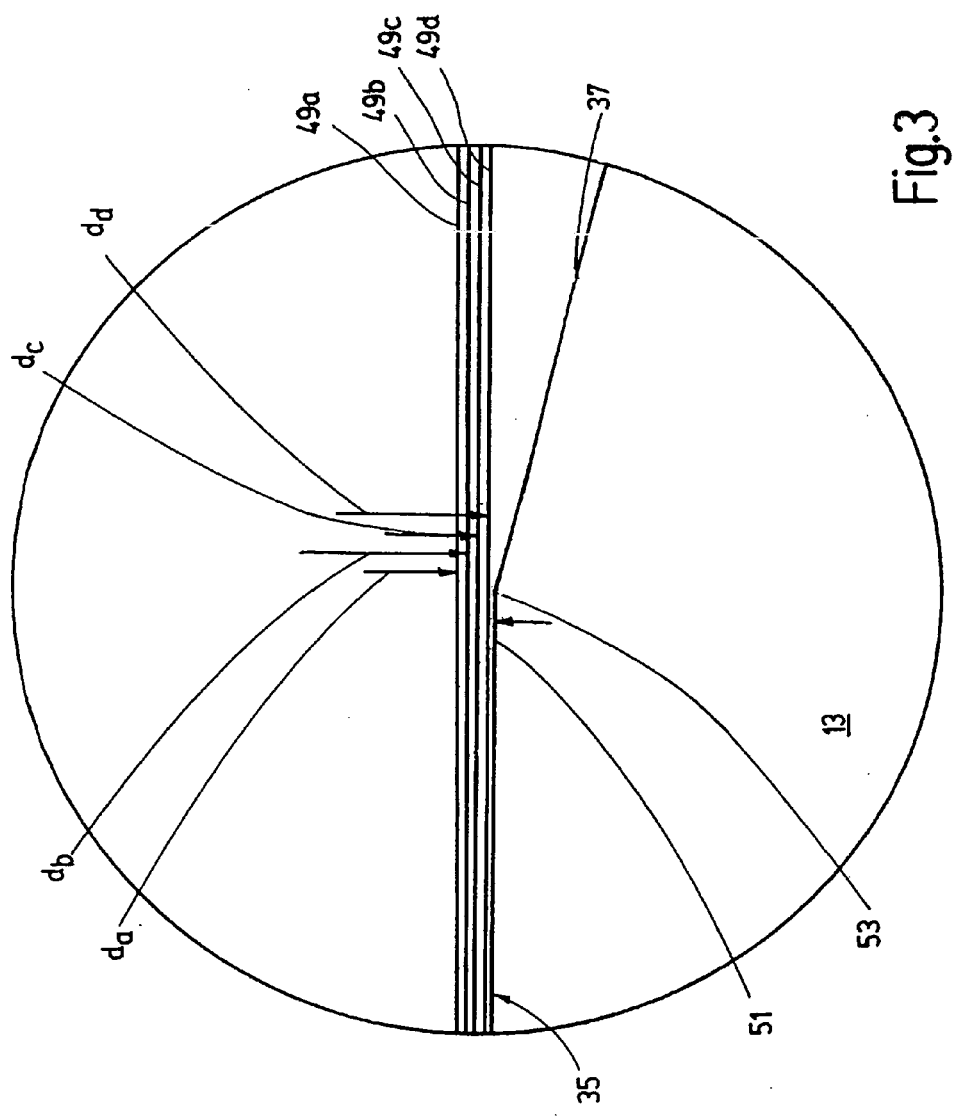
FIG. 3 shows a schematic diagram of a portion of a support surface of the cutting die according to FIG. 2.

FIG. 3 shows a schematic diagram of a portion of a support surface 13, namely, the end region of the support surface 35 of a cutting die 13 which merges into the free surface 37. It is clearly seen that in the transition region between the end region 51 and the free surface 37 a bend 53 is formed as the result of the steeper slope of the free surface 37 compared to the end region 51 of the support surface 35. Since this is only a schematic diagram, the illustration according to FIG. 3 does not show that the support surface 35 has an arched design. The four lines running essentially in parallel represent the circular segments 49a, 49b, 49c, and 49d which, of course, only appear to be parallel and which in reality have curvatures corresponding to the different radii of the borehole wall.

Because FIG. 3 only shows the transition region between the support surface 35 and the free surface 37, i.e., the bend 53, in the illustration according to FIG. 2 the tool edge 19 of the cutting die 13 is situated at a considerable distance left of the bend 53. According to FIG. 2, circular segments 49a through 49d contact one another in the region of the tool edge 19.

It is clear from FIG. 3 that for the largest diameter of the borehole to be machined, circular segment 49a is situated at a distance $d_a$ from the end region 51 of the support surface 35 which is greater than the distance $d_d$ of circular segment 49d from the end region 51. Correspondingly, distance $d_b$ of circular segment 49b is smaller than distance $d_a$. Lastly, distance dc of circular segment 49c from the end section 51 is also smaller than distance $d_b$.

Thus, the smaller the diameters of the borehole to be machined, the smaller are distances $d_a$ through $d_d$ of circular segments 49a through 49d from the end region 51.

It must be expressly noted once more that the support surface 35 is ground with an arch, i.e., with a radius that is smaller than the radius of the borehole to be machined.

Figure 4:
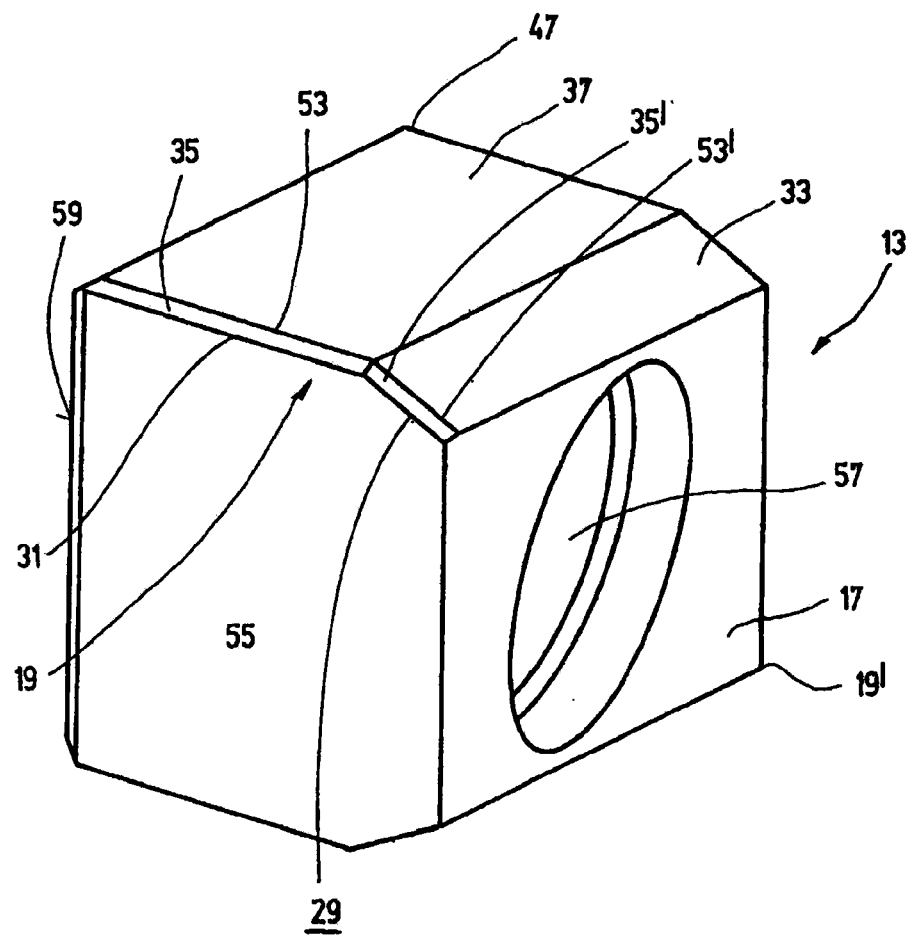
FIG. 4 shows a cutting die of the tool according to FIG. 1 in a front diagonal view.

FIG. 4 shows a cutting die 13 of the tool 1 according to FIG. 1 in a front diagonal view. Identical parts are provided with the same reference numerals, so that reference is made to the preceding figures to avoid repetition in the description.

The cutting die 13 is illustrated in a slightly distorted manner due to the front diagonal perspective view. It is assumed that the cutting die has a rhombic shape as shown in FIG. 1.

Facing toward the observer is a side face 55 of the cutting die 13 which points in the rotational direction of the tool 1 indicated by the arrow 21. The tool edge 19 of the cutting die 13, which includes a primary tool edge 29 and a secondary tool edge 31, is clearly shown. The primary tool edge 29 is sloped in the feed direction indicated by arrow 27 in FIG. 1.

The side face 55 merges into the front side 17 of the cutting die 13, which is provided with a through opening 57 which accommodates the tensioning screw 15.

At the top side the side face 55 merges into the bevel 33 via the primary tool edge 29, and merges into the free surface 37 via the secondary tool edge 31.

The support surface 35 implemented by a rounded cut is provided in particular in the region of the secondary tool edge 31 which directly adjoins the secondary tool edge 31 and merges into the free surface 37 via the bend 53 illustrated in FIG. 3.

In the exemplary embodiment of the cutting die 13 illustrated in FIG. 4, it is indicated by way of example that a support surface 35' realized by a rounded cut may also be provided in the region of the primary tool edge 29, by means of which the cutting die 13 together with the support surface 35 are supported on the wall of the borehole to be machined.

If, as illustrated in FIG. 4, a support surface 35' is also provided in the region of the primary tool edge 29, the viewing points shown in FIG. 3 also apply for the transition between the support surface 35' and the bevel 33, in this case a bend 53' being realized.

Instead of the support surface 35' which is arched at a radius, a flat bevel may also be provided which directly adjoins the primary tool edge 29 and merges into the bevel 33 described above. A bend 53' may also be provided between the bevel adjoining the primary tool edge 29 and the bevel 33 in question, since the two bevels, viewed from the end face 55 outward, extend at a different angle.

However, it is also possible for the bevel 33 to directly adjoin the primary tool edge 29, and for a support surface 35' to be omitted at this location.

The corner 47 of the cutting die 13 explained with reference to FIG. 1 is visible in FIG. 4. Also visible is tool edge 19' situated opposite from tool edge 19, which, however, is provided only when the cutting die 13 is designed as a turning die. If this is not the case, the cutting die 13 has only one tool edge, namely, tool edge 19.

FIG. 4 clearly shows that the back side 59 opposite from the front side 17 is not further modified; in particular, in this case no cutting edges are provided as in the region of the front side 17. However, the cutting die 13 may be designed in such a way that the back side 59 is identical to the front side 17. When the tool edges 19 and 19' become worn, the cutting die 13 may be turned so that the back side 59 points in the feed direction indicated by arrow 27, in which case tool edges corresponding to tool edges 19 and 19' are provided. In this case the cutting die 13 would have a total of four tool edges available for machining a borehole.

Figure 5:
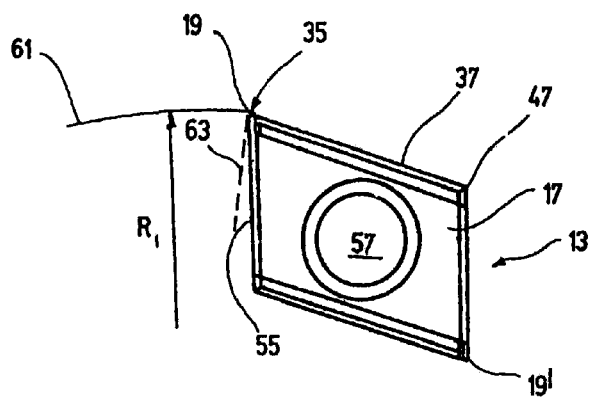
FIG. 5 shows a view through a cutting die of the tool according to FIG. 1.
Figure 5A:
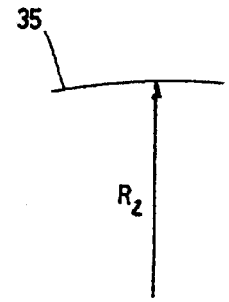
FIG. 5A is a schematic view illustrating the curvature of an arched support surface of the cutting die.

FIG. 5 shows a top view of a cutting die 13 of the tool 1 according to FIG. 1. Identical parts are provided with the same reference numerals, so that reference is made to the preceding figures.

The cutting die 13 has a front side 17 through which a continuous opening 57 for a tensioning screw 15 (not illustrated) passes. The tool edge 19 is indicated in the upper left region, diagonally opposite the tool edge 19'. The corner 47 is also visible.

An auxiliary line 61 shows the progression of the rounded cut in the region of the support surface 35 adjoining the free surface 37.

The radius $R_1$ of the rounded cut is likewise indicated by an arrow, i.e., the radius $R_2$ of the arch of the support surface 35.

The side face 55 illustrated in FIG. 5 is situated only on a diameter line of the tool 1. According to the illustration in FIG. 5, the side face is swiveled to the right with respect to this diameter line, indicated by an auxiliary line 63. The imaginary swivel axis is perpendicular to the image axis of FIG. 5, and passes through the tool edge 19.

Figure 6:
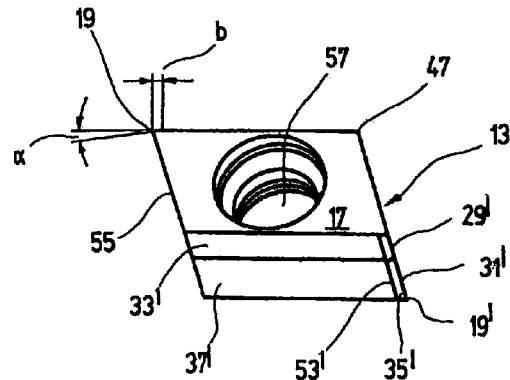
FIG. 6 shows a perspective view of a cutting die of the tool according to FIG. 1, viewed diagonally from below.

FIG. 6 shows a perspective view of a cutting die 13 according to FIG. 1, viewed diagonally from below. Identical parts are provided with the same reference numerals, so that reference is made to the preceding description.

The rhombic shape of the base body of the tool edge 13 is clearly visible in this illustration. Also visible are the tool edge 19, through opening 57, corner 47, tool edge 19', side face 55, and front side 17 of the cutting die 13. FIG. 6 shows an angle α, namely, the angle by which a bevel directly adjoining the primary tool edge 29 is inclined.

FIG. 6 also indicates the width b of this bevel. The support surface 35, which is provided at least in the region of the secondary tool edge 31, also extends over the region of this width b.

Since FIG. 6 also shows a perspective view of the underside of the cutting die 13 which in FIG. 1 faces the adjusting element 39, also visible here are the bevel 33 in the region of the primary tool edge 29' and the free surface 37' in the region of the secondary tool edge 31'. The support surface 35' and the bend 53' in the region of the tool edge 19' are also shown.

The tool 1 illustrated in FIG. 1, as previously stated, is a fine borehole machining tool which is particularly suited for finishing boreholes. In this case the radial depths of cut are generally a maximum of 0.5 mm.

However, tools designed in the above manner may also be realized which are equipped for rough machining tools, i.e., which allow machining with greater depths of cut of 6 mm to 8 mm. Here as well, it has been shown that as a result of the support surface the tool runs over a given diameter range much more smoothly, i.e., without vibrations, in the machining of boreholes, compared to conventional tools.

Figure 7:
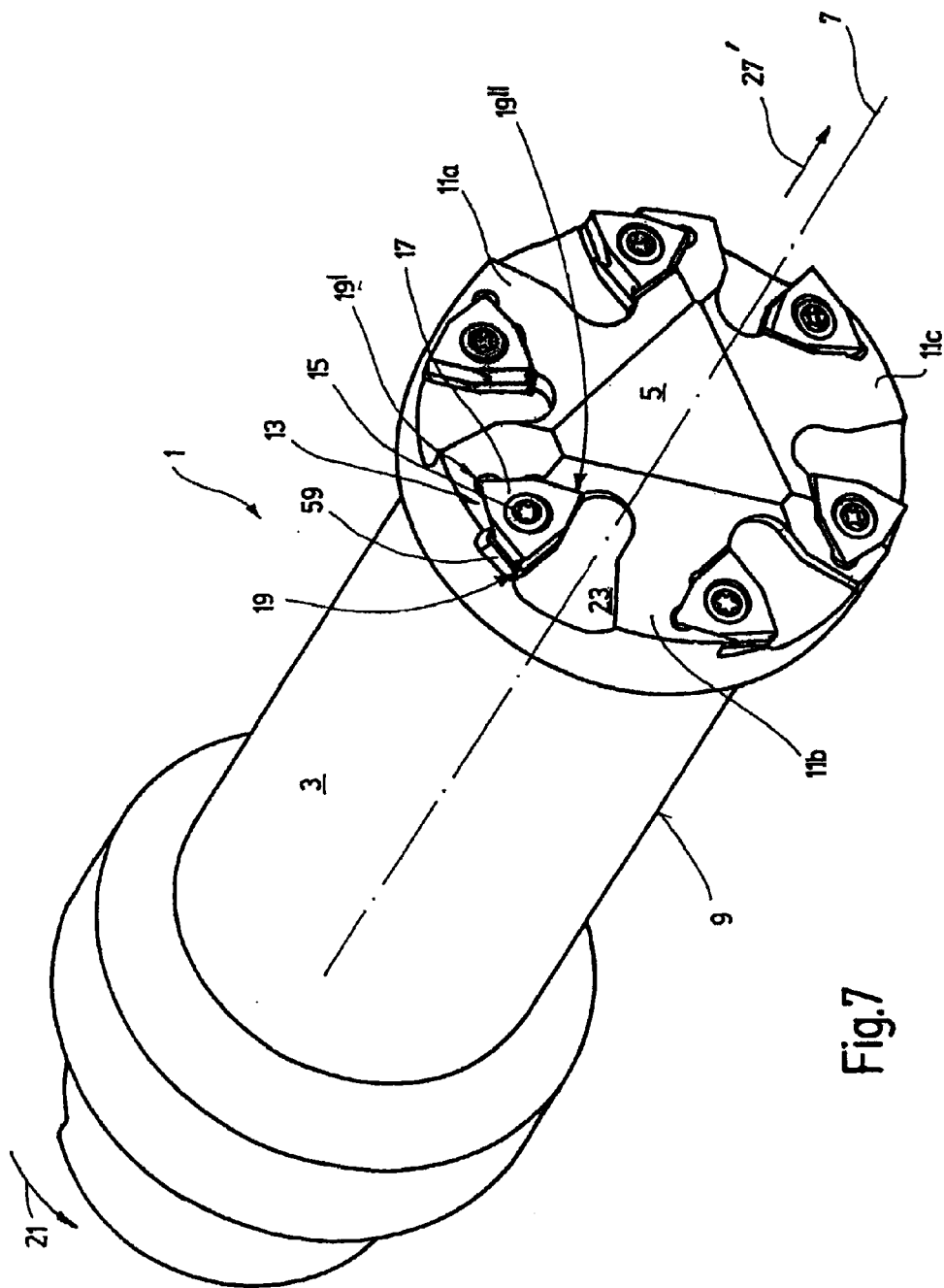
FIG. 7 shows a perspective front view of a second exemplary embodiment of a tool.

FIG. 7 shows a perspective front view of a second exemplary embodiment of a tool 1 which is used for rough machining and has at least three cutting dies. In the exemplary embodiment illustrated here, six cutting dies are provided in pairs approximately opposite one another. In addition, only one tool edge is described here, since all the other tool edges have an identical design.

For simplicity, parts corresponding to those previously described are provided with the same reference numerals.

The tool 1 has a base body 3 with an end face 5. Also visible are a center axis 7 and the peripheral surface 9. The end face 5 lies in a plane perpendicular to the center axis 7. Regions which slope relative to the end face 5 can be seen which essentially correspond to the annular surface 11, namely, regions 1a, 11b, and 11c, in which in this case the six cutting dies are embedded. These cutting dies are situated quasi-tangentially, namely, in such a way that their front sides are essentially parallel to the corresponding regions.

The discussion below also relates to the cutting die situated in the upper left region. This cutting die has a polygonal design, in this case essentially triangular by way of example, except that the three side edges each have an outwardly directed bend in the center. The cutting die 13 is fastened to the base body 3 by means of a tensioning screw 15 which passes through the cutting die 13 and engages in the base body 3. Other types of attachment, such as in the exemplary embodiment illustrated in FIG. 1, are possible, and are also known.

The cutting die 13 shown here has an upper left tool edge 19, an upper right tool edge 19', and a lower cutting edge 19" facing the direction of the center axis 7.

Thus, if tool edge 19 is worn or damaged, the cutting die 13 may be rotated by 120° about the axis of the tensioning screw 15 so that tool edge 19', or upon further rotation, tool edge 19", appears at the location of tool edge 19.

Furthermore, the cutting die 13 may be turned in such a way that the front side 17 rests on the base body 3 and the back side 59 of the cutting die 13 points toward the front, i.e., essentially in the feed direction 27 of the tool 1 indicated by arrow 27.

In this case the cutting die 13 of the tool 1 shown in FIG. 7, designed as a rough machining tool, thus has a total of six tool edges.

The cutting dies of the tool 1 according to FIG. 7 are sloped in two directions: on the one hand, starting from the center axis 7, they slope outwardly in the direction of the peripheral surface 9. On the other hand, viewed from the center axis 7 they are tilted in the clockwise direction, so that in the illustration according to FIG. 7 tool edge 19 is situated higher than tool edge 19', and engages with the wall of a borehole during machining of same.

The exemplary embodiment of the tool 1 illustrated in FIG. 7 also provides that, viewed in the rotational direction illustrated by an arrow 21, the blade plate 13 precedes a chip space 23. Here as well, a coolant/lubricant channel may flow, which for simplicity is not illustrated.

Figure 8:
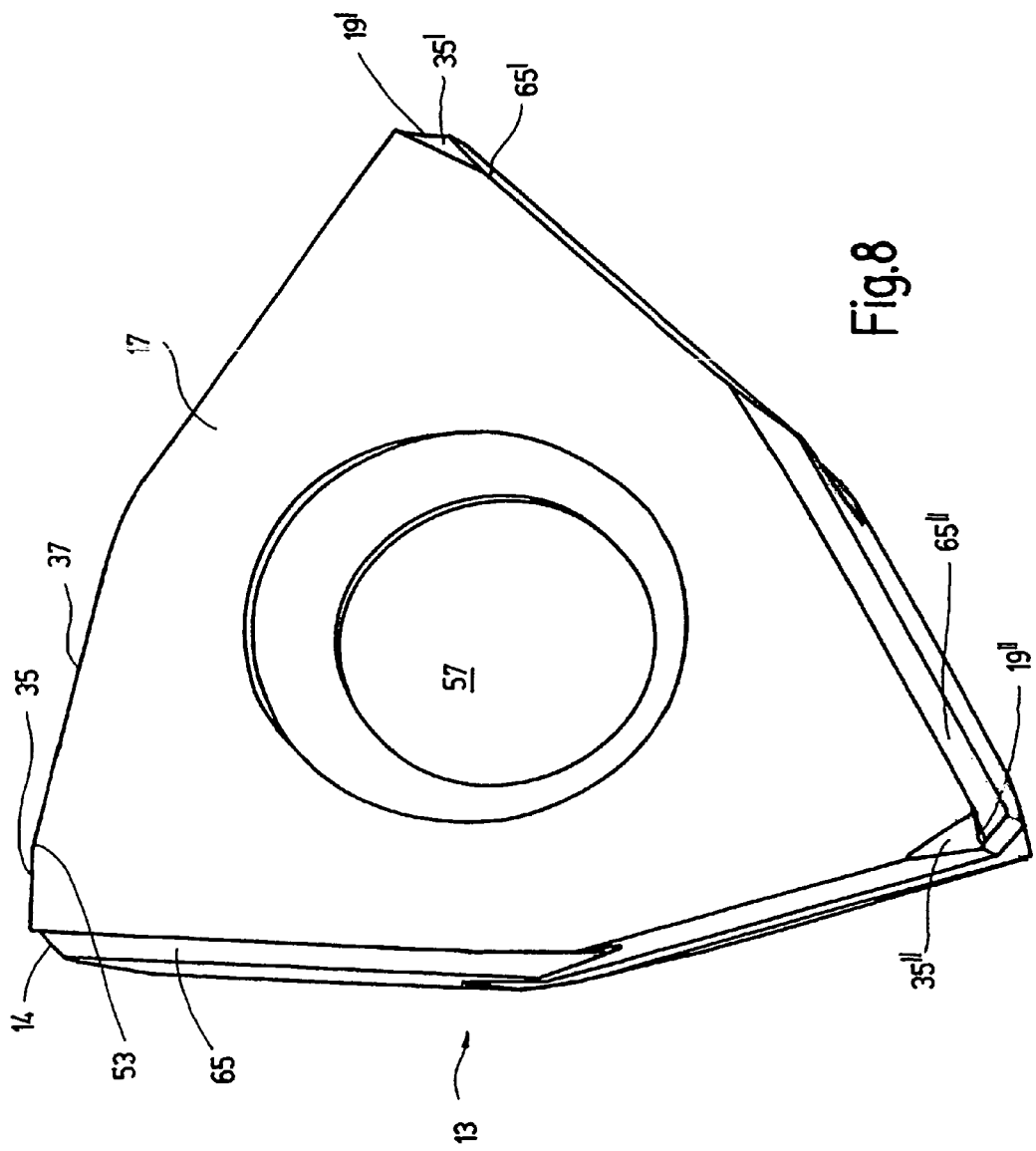
FIG. 8 shows a perspective front view of a cutting die of the tool according to FIG. 2.

FIG. 8 shows a perspective front view of the cutting die 13 of the tool 1 according to FIG. 2 in the direction of the center axis 7. Seen at the top left is tool edge 19, at the right, tool edge 19', and at the bottom, tool edge 19". Adjoining the tool edge 19 to the right is the region of the rounded cut, i.e., the support surface 35. This support surface merges into the free surface 37 of the tool edge 19 via the bend 53.

The support surfaces 35' and 35" may be seen more clearly at tool edges 19' and 19", respectively. A chip space is associated with each of the tool edges, namely, a chip space 65 associated with tool edge 19, a chip space 65' associated with tool edge 19', and a chip space 65" associated with tool edge 19". For a rough machining tool the tool edges extend practically over the entire width of the associated chip space.

FIG. 8 shows that a through opening 57 passes through the front side 17 of the cutting die 13, through which the tensioning screw can pass in order to fasten the cutting die 13 to the base body 3 of the tool 1, as shown in FIG. 7.

Figure 9:
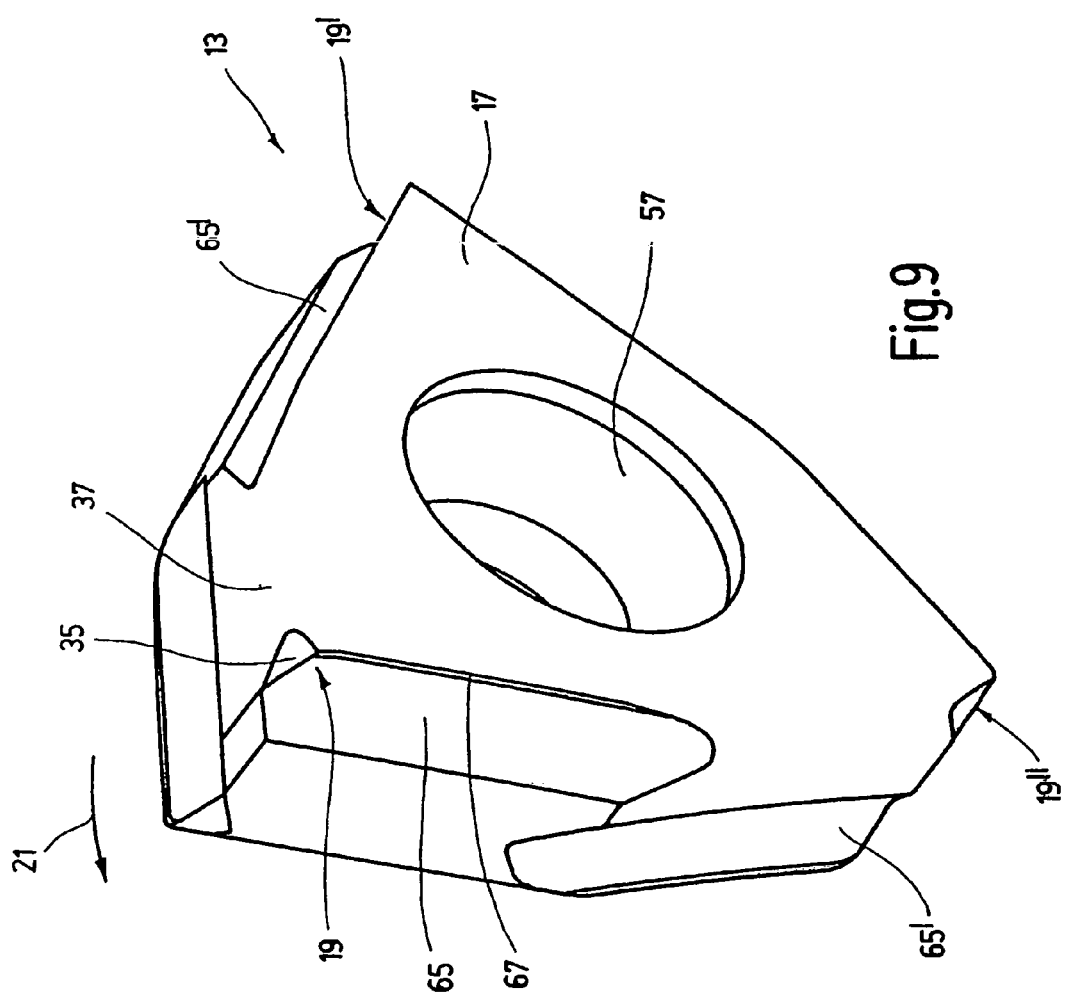
FIG. 9 shows a perspective bottom view of a cutting die of the tool according to FIG. 2.

FIG. 9 shows a perspective bottom view of the cutting die 13 previously discussed with reference to FIGS. 7 and 8. Identical parts are provided with the same reference numerals, so that reference may be made to the preceding description.

On its front side 17 the cutting die 13 has three tool edges 19, 19', and 19", as previously described with reference to FIG. 8. The chip space 65 for tool edge 19 merges into the front side 17 of the cutting die 13 via a protective bevel 67. A protective bevel is correspondingly provided for the chip space 65' for tool edge 19' and for the chip space 65" associated with tool edge 19".

Here as well it is clearly shown that a through opening 57 passes through the front side 17, through which the tensioning screw 15 illustrated in FIG. 7 passes.

A support surface 35 implemented by means of a rounded cut is associated with tool edge 19. The support surface of tool edge 19' and likewise the support surface of tool edge 19" are not visible.

Here as well, the support surfaces have an arched design, the radius of the arch being smaller than that of the borehole to be machined.

In this case the front side 17 merges into the free surfaces of the tool edges via a radius. FIG. 9 shows the free surface 37 which, viewed in the rotational direction indicated by an arrow 21, follows behind the support surface 35.

Figure 10:
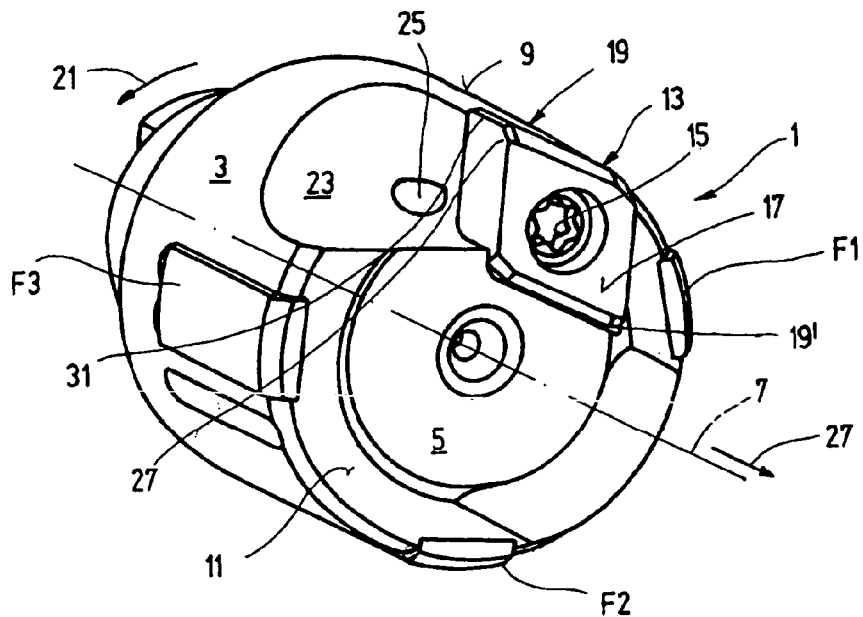
FIG. 10 shows a perspective front view of a third exemplary embodiment of a tool.

In other respects, the discussion of the support surfaces and free surfaces for the first exemplary embodiment applies correspondingly, FIG. 10 shows a third exemplary embodiment of a tool 1. Identical parts described in the preceding exemplary embodiments are provided with the same reference numerals, so that reference is made to the description of the preceding figures to avoid repetition.

The tool 1 according to FIG. 10 is characterized in that it is supported via three surfaces inside the borehole to be machined. The tool has a base body 3 with an end face 5 which lies in a plane perpendicular to the center axis 7 of the tool 1.

The end face 5 has an annular surface 11 which slopes outwardly in the direction of the peripheral surface 9 of the tool 1. A cutting die 13 is fastened to the end face 5 of the tool 1. In this case, the same as for the other exemplary embodiments, the cutting die 13 is preferably embedded in the annular surface 11 of the end face 5. The cutting die 13 is attached tangentially to the tool 1; i.e., the front face of the cutting die 13 is essentially parallel to the annular surface 11 of the tool 1.

The cutting die 13 is fixed to the base body 3 of the tool 1 by means of an appropriate mounting. In this case a tensioning screw 15 is provided which passes through the front side 17 of the cutting die 13 and engages in the base body 3 of the tool 1.

Here as well, the cutting die 13 has a polygonal design that is essentially rhombic as viewed from above. The upper left corner of the cutting die 13 forms the tool edge 19 of the cutting die, and the tool edge projects beyond the peripheral surface 9 of the base body 3 of the tool 1, and upon rotation of the tool 1 in the direction of the arrow 21 removes shavings from a wall of a borehole. These shavings pass into a chip space 23 into which a coolant/lubricant channel 25 may flow. The coolant/lubricant is used to cool the tool edge 19, to discharge the shavings passing into the chip space 23, and to lubricate the tool 1 in the borehole to be machined.

As a rule, the tool 1 illustrated in FIG. 10 is set in rotation to machine a borehole wall. The discussion of the tool 1 in FIG. 1 correspondingly applies.

Here as well, the tool edge 19 for the cutting edge 13 has two regions, namely, a primary tool edge 27 inclined in the feed direction identified by arrow 27', and a secondary tool edge 31 inclined in the opposite direction. In this case the cutting die 13, the same as for the other exemplary embodiments, is designed as a turning die; i.e., the diagonally opposite corner of the cutting die 13 is likewise provided as a tool edge 19'. When the tool edge 19 is worn or damaged, the cutting die 13 is rotated by 180.degree. about an axis perpendicular to the front side 17, so that the tool edge 19' is situated in the position of the tool edge 19 shown in FIG. 10.

In other respects, the entire discussion for the cutting die 13 with reference to FIGS. 1 through 6 applies to the cutting die 13 shown in FIG. 10.

With respect to the cutting die 13 itself, the exemplary embodiment of the tool 1 shown in FIG. 10 does not differ from the exemplary embodiment of the tool 1 or the cutting die 13 as illustrated in FIGS. 1 through 6.

FIG. 10 shows that the exemplary embodiment of the tool 1 illustrated here has only one cutting die 13, and at least one guide strip F is also provided. In the exemplary embodiment illustrated here, three guide strips F1, F2, and F3 are provided. A first guide strip F1 precedes the tool edge 19 for the cutting die 13 preferably by 40°, viewed in the rotational direction of the tool 1 indicated by arrow 21. The second guide strip F2 is situated opposite from the tool edge 19 for the cutting die 13, whereby an imaginary line which intersects the tool edge 19 and the center axis 7 centrally intersects the guide strip F2. A third guide strip F3 is situated such that it follows behind the second guide strip F2, viewed in the rotational direction indicated by arrow 21, by 90°.

As made evident in the discussion of the preceding figures, the cutting die 13 has a support surface 35, produced by a rounded cut, which has an arched design, the radius of the arch being smaller than the radius of the borehole to be machined. The tool 1 is thus supported on the one hand on this support surface 35, and on the other hand is supported on the at least one guide strip. In the exemplary embodiment illustrated in FIG. 10, the tool 1 is supported on the support surface 35 (not illustrated in FIG. 10) of the cutting die 13 and is also supported on guide strips F1, F2, and F3.

Compared to the tools illustrated with reference to FIGS. 1 through 9, which are supported inside a borehole to be machined solely by means of support surfaces 35 produced by a rounded cut on cutting dies 13, in the exemplary embodiment of the tool 1 illustrated in FIG. 10 only one cutting die 13 is provided, which is tangentially inserted into the end face 5 of the tool 1 and has a rounded cut which forms a support surface on which the tool 1 may be supported. In this case three guide strips F1, F2, and F3 are also provided.

Figure 11:
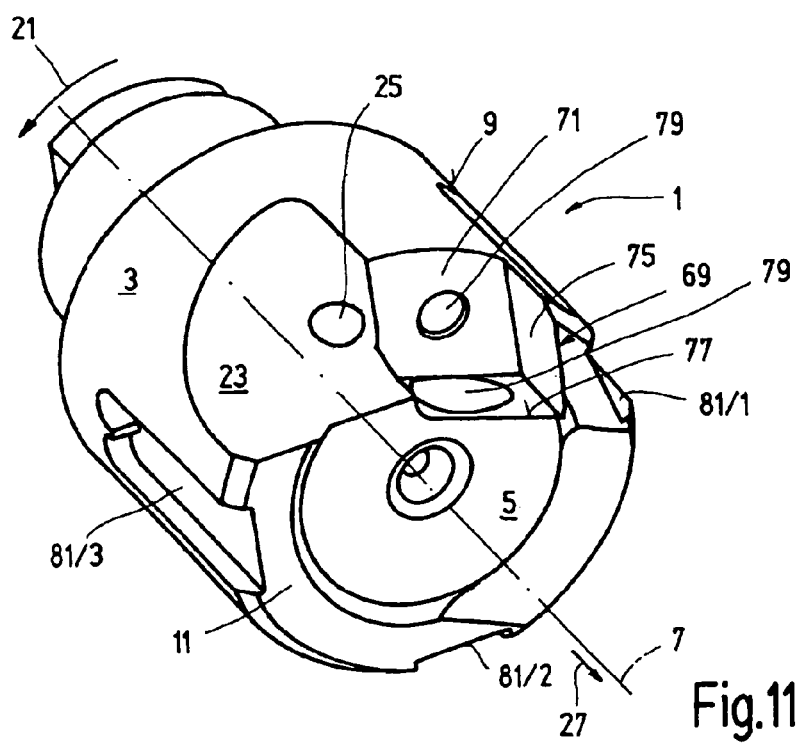
FIG. 11 shows a perspective view of the tool according to FIG. 10, without a cutting die.

FIG. 11 shows the tool 1 according to FIG. 10, without a cutting die and without guide strips. It is clearly seen that recesses have been introduced into the base body 3, into which the cutting die and the guide strips are inserted. Identical parts are provided with the same reference numerals, so that in this regard reference is made to the description for FIG. 10.

For accommodating the cutting die 13, a recess 69 is provided which includes a base surface 71 having a threaded borehole 73 for the tensioning screw (not illustrated here), a lateral support surface 75, and a contact surface 77 facing the center axis 7. The contact surface has a recess 79 by means of which a set screw is able to act on the cutting die 13 to allow adjustment of the relative position thereof with respect to the base body 3 of the tool 1. The set screw may optionally cooperate with a driving wedge.

Also shown in FIG. 11 are recesses 31/1, 31/2, and 31/3, extending essentially parallel to the center axis 7, for the at least one guide strip, i.e. in the present case, guide strips F1, F2, and F3.

The number of recesses basically depends on the number of guide strips.

Figure 12:
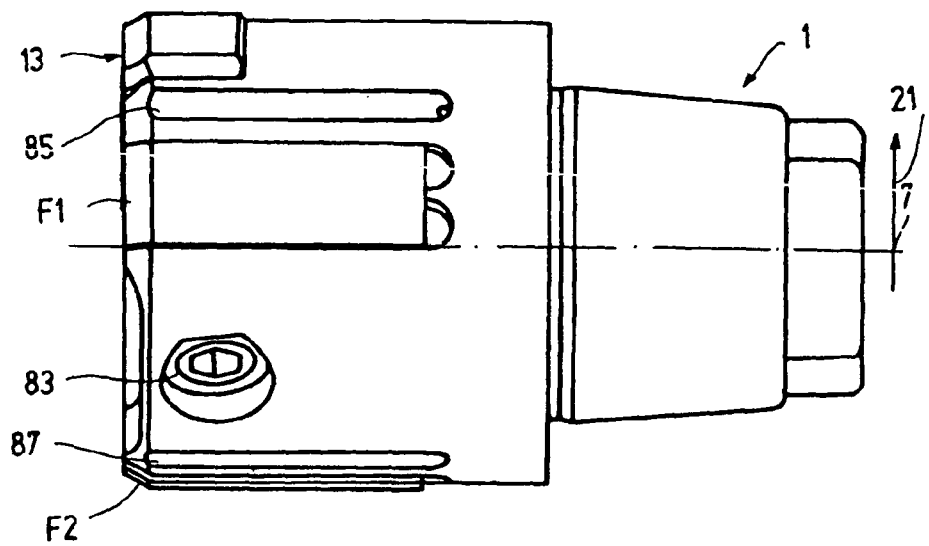
FIG. 12 shows a side view of the tool according to FIG. 10.

FIG. 12 shows the tool 1 in a side view, namely, taking into account the perspective according to FIG. 10, a side view from the right. Identical parts are provided with the same reference numerals, so that reference is made to the preceding figures to avoid repetition.

The blade plate 13 and guide strip F1 are shown in FIG. 12. Also shown is the set screw 83, mentioned with reference to the discussion for FIG. 11, used for radial adjustment of the blade plate 13. Guide strip F2, mentioned above with respect to FIG. 10, is situated opposite the blade plate 13.

From the illustration according to FIG. 12 it is seen that, viewed in the rotational direction indicated by arrow 21, an oil groove 85 precedes guide strip F1 and an oil groove 87 precedes guide strip F2, into which oil grooves the coolant/lubricant is supplied to ensure optimal cooling and lubrication in the region of the guide strips. FIG. 10 shows that a corresponding oil groove is also provided for guide strip F3 at that location.

Figure 13:
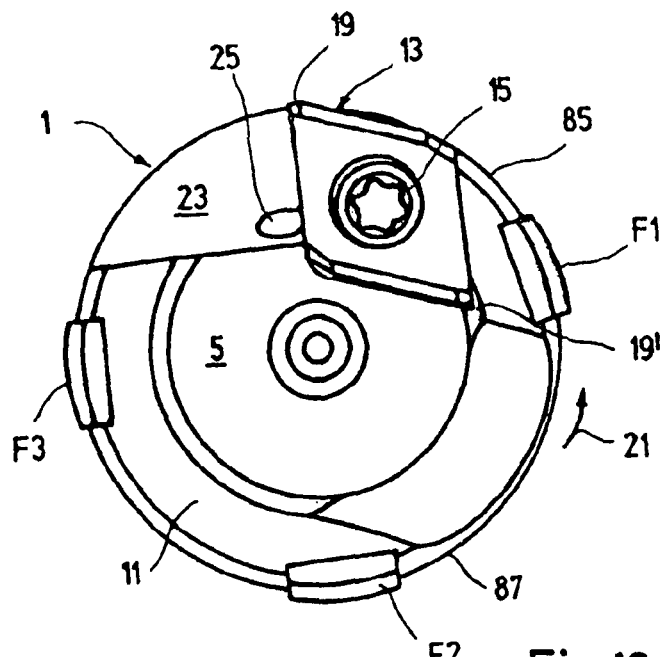
FIG. 13 shows an end face view of the tool illustrated in FIGS. 10 and 12.

FIG. 13 shows the tool 1 represented in FIGS. 10 through 12 in the front view, identical parts being provided with the same reference numerals, so that reference is made in particular to FIG. 10. It is particularly obvious here that the blade plate 13 has a rhombic design and is embodied as a turning die. The external tool edge 19 is diagonally opposite from a second tool edge 19', previously discussed above.

It is clear that, viewed in the rotational direction indicated by arrow 21, the first guide strip F1 follows behind the cutting die 13 by approximately 40°, the second guide strip F2 is situated opposite from tool edge 19, and guide strip F3 precedes tool edge 19 by 90° and follows behind guide strip F2 by 90°.

FIG. 13 also shows that the tool 1 is supported on a support surface of the cutting die 13 and on the at least one guide strip, in this case the three guide strips F1, F2, and F3 on the walls of a borehole to be machined.

It is expressly noted that the following summary discussion concerning the action of the support surfaces also applies to the tool according to FIG. 1, i.e., the fine machining tool, and to the tool according to FIG. 7, i.e., the rough machining tool, and also correspondingly applies to the tool according to FIG. 10.

During machining of a borehole, the tool 1 is supported on the walls of the borehole, namely, in the region of the support surfaces 35 provided for the at least three cutting dies 13. Six cutting dies are preferably provided in pairs opposite one another for the two types of tools according to FIGS. 1 and 7. However, this is not absolutely necessary. Fewer cutting dies, but for the tools according to FIGS. 1 and 7, at least three, are provided. For the tool according to FIG. 10 only one cutting die is provided, in addition to the at least one guide strip.

In the exemplary embodiments illustrated in FIGS. 1 and 7, the tool 1 is supported on the support surface 35 of the six cutting dies associated with the respective tool edge 19.

For all the tools, the support surfaces 35 of the cutting dies 13 are arched with a radius R which is smaller than the radius of the borehole to be machined. The region of a support surface directly adjoining a tool edge 19 rests against the wall of the borehole to be machined. The end region 51 of the support surfaces 35 situated at a distance from the tool edge 19 is situated at a distance from the wall of the machined borehole because the radius of curvature of the support surfaces is smaller than that of the borehole wall.

The following dimensions are preferred: For the machining of a borehole having a diameter of 60 mm to 120 mm, the radius R of the rounded cut of the support surface 35 is set at 30 mm. The width of the support surface 35, measured in the circumferential direction, is preferably set at 0.8 mm. If the borehole to be machined has a diameter of 121 mm to 180 mm, the radius R of the support surface 35 provided with a rounded cut is set at 60 mm. The width of the support surface measured in the circumferential direction is 1.2 mm.

For the machining of boreholes in the range of 181 mm to 250 mm, a radius R of the rounded cut is selected at 90 mm, and a width of the support surface 35 is selected at 1.6 mm.

The following specification for the radius of curvature of the support surfaces 35 may also be selected: The radius of curvature of the support surfaces 35 is matched to the radius of the borehole to be machined such that in the end region 51, in particular in the region of the bend 53 in which the support surface 35 merges into the free surface 37 between the end region and the machined wall, a distance d is provided which ranges from 0.02 mm to 0.001 mm, in particular form 0.01 mm to 0.003 mm. A distance d of $\leq 0.005$ mm is particularly preferred.

By use of this design of the support surface 35 resulting from the rounded cut, boreholes having a specified diameter range may be machined. In other words, the same tool edge may be used for different borehole diameters, provided that the distance d between the wall of the borehole to be machined and the end region 51 of a support surface 35 lies in the above-referenced range.

Although in this case a tool 1 is realized which has no circular grinding bevel with a radius of curvature that corresponds to the borehole to be machined, i.e., although the identical supporting effect provided by conventional tools is not achieved, it is shown that the tool 1 is optimally guided into the boreholes to be machined, although the radius of curvature of the support surface 35 produced by the rounded cut is smaller than that of the borehole to be machined.

For the tools 1 it is provided that the cutting dies 13 are designed as turning dies and are exchangeable. The cutting dies are situated in the end face side of the tools 1 and fastened to the base body 3 quasi-tangentially to the end face 5. The cutting dies may be swiveled with respect to an exact tangential orientation about two axes in space, and thus slope outward, viewed from the center axis 7 of the tool 1, and at the same time are twisted in such a way that the active tool edge 19 is at the highest position, in particular higher than the regions of the cutting die 13 following behind, viewed in the rotational direction indicated by arrow 21. The swiveling in three dimensions achieves the necessary clearance angle of the cutting edge 19. In other respects, it has been shown that the larger the diameter of the borehole to be machined, the larger the width b of the support surface 35, previously explained with reference to FIG. 6.

It has also been shown that existing tools may be retrofitted with cutting dies of the type discussed herein. This results in the advantage that the cutting dies may be used not only for a given diameter, but, rather, for a diameter range, provided that the ranges specified for the distance d between the borehole wall to be machined and the end region 51 of a support surface 35 are maintained, i.e., provided that a distance d preferably $\leq 0.005$ mm is present.

The advantages of the support surface 35 realized by a rounded cut described herein result for cutting dies 13 having one or more tool edges. Cutting dies 13 may also be used which are designed as turning dies. The tool edges of a cutting die may be provided in the region of the front side 17, as previously discussed with reference to FIGS. 1 through 6. However, tool edges may also be provided in the region of the front side 17 as well as in the region of the back side 59 of the cutting die 13, as previously discussed by way of example with reference to the cutting die 13 of the second exemplary embodiment of the tool 1 according to FIG. 7.

Furthermore, from the discussion it is clear that the cutting dies 13 may have a polygonal design, and in particular multiple tool edges may be realized on the same cutting die.

Lastly, it is clear from the discussion that the cutting dies 13 may be inserted into the base body 3 of a tool 1 so as to be adjustable: when a tool edge 19 wears out, the cutting die 13 may be moved radially outward by means of a suitable adjusting device in order to achieve the desired diameter of the tool 1 and thus the diameter of the machined borehole. In addition, to achieve greater accuracy it is advantageous for the cutting dies to be radially adjustable when mounted in the base body 3 of a tool 1.

Altogether, it has been shown that the advantages of the tools described herein result not only for tools having multiple tool edges, as previously discussed with reference to FIGS. 1 through 9, but also for tools having only one tool edge and at least one guide strip, as previously described with reference to FIGS. 10 through 13. In all cases, this results in optimal support of the tool inside a borehole to be machined, either exclusively by means of support surfaces on cutting dies, or by means of one support surface of a cutting die and at least one guide strip.

The tangential inserted position of the cutting die 13 in the end face 5 of the tool 1 provides several advantages: The contact surface of the cutting die on the base body 3 of the tool 1, which is critical for the taper of the secondary tool edge, i.e., the slope of the secondary tool edge of the cutting die 13 opposite the feed direction indicated by arrow 27', has a large surface area and is precisely defined in the base body 3. However, the same as for all the exemplary embodiments of the tools described herein, it is particularly advantageous that for the adjustment, the effective direction of the adjusting device for the cutting dies, i.e., the set screw and a driving wedge which may be provided, i.e., the functional surfaces on the cutting die, is completely independent of the contact surface on the base body, which determines the taper.

The recess 69 for the cutting die 13 has been described with reference to FIG. 11. The cutting die 13 rests with its entire surface on the base surface 71, and the taper, i.e., the slope of the secondary tool edge of the cutting die 13, is determined by this contact. The cutting die is radially adjusted by means of the set screw 83, and a driving wedge which may be provided which acts on the cutting die 13 by means of the recess 79 in the contact surface 77. This cutting die is thus displaced parallel to the base surface 71 when the radius of the tool 1 is adjusted, as the result of which the taper is not changed.

In particular for fine machining tools, i.e., for a tool according to FIG. 1 or FIG. 10, it is advantageous to achieve a taper of 1 μm/mm.

For tools of the type described here, relatively thick cutting dies may be used for achieving optimal values of the length of the secondary tool edges and also double bevels; i.e., viewed in the feed direction indicated by arrow 27 the primary tool edge 29 may have sloping regions of various angles which remove shavings from the borehole wall to be machined.

The invention claimed is:

1. A tool for machining borehole surfaces comprising
a base body;
a cutting device having at least one cutting die with at least one geometrically defined tool edge, the at least one cutting die being tangentially fastened to an end face of the tool; and
at least one guide surface for guiding the tool inside the machined borehole,
wherein the at least one cutting die is provided with a rounded cut for producing a support surface adjacent to the tool edge, the support surface being arched with a radius that is smaller than the radius of the borehole to be machined, and the region of the support surface directly adjoining the tool edge resting against the borehole wall to be machined, and the end region of the support surface—viewed in the peripheral direction of the tool—which is situated at a distance from the tool edge being situated at a distance from the wall of the borehole;
wherein the support surface has an end region which merges into a free surface via a bend, the free surface having a steeper slope than the end region of the support surface, and a distance between the end region of the support surface from the wall of the borehole is approximately 0.02 mm to approximately 0.001 mm.

2. The tool according to claim 1, wherein the cutting die is embedded in the end face.

3. The tool according to claim 1, wherein the distance is approximately 0.01 mm to approximately 0.003 mm.

4. The tool according to claim 1, wherein the distance is no greater than approximately 0.005 mm.

5. The tool according to claim 1, wherein the at least one guide surface is formed by a guide strip or by another cutting die which is provided with a rounded cut for producing a support surface which acts as a guide surface, the support surface being arched with a radius that is smaller than the radius of the borehole to be machined, and the region of the support surface directly adjoining the tool edge resting against the borehole wall to be machined, and the end region of the support surface—viewed in the peripheral direction of the tool—which is situated at a distance from the tool edge being situated at a distance from the wall of the borehole.

6. The tool according to claim 1, wherein the tool comprises one cutting die and two guide strips, or one cutting die and at least two additional cutting dies, all the cutting dies being provided with a rounded cut.

7. The tool according to claim 1, wherein the cutting die is designed as a finishing cutting die or a rough machining cutting die.

8. The tool according to claim 1, wherein the cutting die has a polygonal design as viewed from the top.

9. The tool according to claim 1, wherein the cutting die has a rhombic design.

10. The tool according to claim 1, wherein the cutting die has an essentially triangular design.

11. The tool according to claim 1, wherein the side edges of the cutting die have a bent progression.

12. The tool according to claim 1, wherein the cutting die may be rotated and/or turned.

13. The tool according to claim 1, wherein the cutting die is disposed proximate the end face of the tool.

14. The tool according to claim 1, wherein the cutting die is fastened to the base body of the tool essentially tangentially in the region of the end face.

15. The tool according to claim 1, wherein the cutting die is inclined about at least one axis with respect to an imaginary plane that is perpendicular to the center axis of the tool.

16. The tool according to claim 1, wherein the cutting die has a primary tool edge and a secondary tool edge, and the support surface is preferably associated with the secondary tool edge.

17. The tool according to claim 1, wherein the radius of the rounded cut in the region of the support surface is approximately 30 mm, and the width of the support surface is approximately 0.8 mm for tools to machine boreholes having a diameter of approximately 60 mm to approximately 120 mm.

18. The tool according to claim 1, wherein the radius of the rounded cut in the region of the support surface is approximately 60 mm, and the width of the support surface is approximately 1.2 mm for tools to machine boreholes having a diameter of approximately 121 mm to approximately 180 mm.

19. The tool according to claim 1, wherein the radius of the rounded cut in the region of the support surface is approximately 90 mm, and the width of the support surface is approximately 1.6 mm for tools to machine boreholes having a diameter of approximately 181 mm to approximately 250 mm.

20. The tool according to claim 15, wherein the cutting die is inclined about two axes with respect to the imaginary plane.

* * * * *